(12) United States Patent  
Srivatsan (10) Patent No.: US 9,134,931 B2  
(45) Date of Patent: Sep. 15, 2015

(54) PRINTING CONTENT OVER A NETWORK

(71) Applicant: Hewlett-Packard Development Company, L.P., Houston, TX (US)

(72) Inventor: Mohan Srivatsan, Bangalore (IN)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 24 days.

(21) Appl. No.: 13/874,428

(22) Filed: Apr. 30, 2013

(65) Prior Publication Data

US 2014/0320896 A1   Oct. 30, 2014

(51) Int. Cl.
*G06K 15/00* (2006.01)
*G06F 3/12* (2006.01)
*H04N 1/00* (2006.01)

(52) U.S. Cl.
CPC ............ *G06F 3/1204* (2013.01); *G06F 3/1208* (2013.01); *G06F 3/1243* (2013.01); *G06F 3/1287* (2013.01); *H04N 1/00* (2013.01); *G06F 2206/151* (2013.01)

(58) Field of Classification Search
USPC ................. 358/1.15, 1.12, 1.18, 2.1, 530
See application file for complete search history.

(56) References Cited

U.S. PATENT DOCUMENTS

| | | | |
|---|---|---|---|
| 6,134,020 A | 10/2000 | Masumoto et al. | |
| 6,621,595 B1 | 9/2003 | Fan | |
| 7,050,650 B2 | 5/2006 | Maurer | |
| 7,113,952 B2 * | 9/2006 | Aoyama et al. | 1/1 |
| 7,519,558 B2 | 4/2009 | Ballard et al. | |
| 7,602,972 B1 | 10/2009 | Wel et al. | |
| 7,865,042 B2 | 1/2011 | Cattrone et al. | |
| 2002/0073093 A1 * | 6/2002 | Aoyama et al. | 707/101 |
| 2004/0049626 A1 * | 3/2004 | Aoyama et al. | 711/100 |
| 2005/0037367 A9 | 2/2005 | Flekowsky | |
| 2005/0226503 A1 | 10/2005 | Bailey et al. | |
| 2010/0058294 A1 * | 3/2010 | Best et al. | 717/122 |
| 2011/0069352 A1 * | 3/2011 | Yaguchi et al. | 358/1.16 |
| 2012/0081731 A1 * | 4/2012 | Suzuki | 358/1.13 |
| 2012/0307294 A1 * | 12/2012 | Matsuda | 358/1.15 |
| 2013/0050757 A1 * | 2/2013 | Tomomatsu et al. | 358/1.15 |

OTHER PUBLICATIONS

Lanier, LW5100/LW7140, 2009, pp. 1-6, Available at: <lanier.com/products/brochures/wideformat/LW5100.pdf>.

* cited by examiner

*Primary Examiner* — Jerome Grant, II (74) *Attorney, Agent, or Firm* — Mannava & Kang, P.C.

(57) ABSTRACT

Systems and methods for printing content over a network are described herein. The method comprises receiving, based on user instructions, the content to be printed on a printing media. A layout of the printing media is stored in a database. The method further includes retrieving metadata associated with the content and the printing media. The method also includes comparing the metadata associated with the content and the printing media to align the content on the printing media. Furthermore, the method includes printing the content on the printing media, based on the alignment.

11 Claims, 5 Drawing Sheets

Figure 4

PRINTING CONTENT OVER A NETWORK

BACKGROUND

A printer is usually connected to a computing system either directly or over a communication network, such as a local area network (LAN) or a wide area network (WAN). Different kinds of printers are commercially available, such as inkjet printers and laser printers. Many commercially available printers, also referred to as multifunction devices, provide the functionalities of a scanner as well as that of a printer.

Typically, to print a document, a user selects a print command from an application program running on a host system, to initiate print services. The print services generate a user interface in the form of a print dialog box that allows the user to select various print options, such as source of media, number of copies of the document, page orientation, print quality, and pages per sheet of the media. After the user selects the print option and commences the print operation, a printer driver converts the document to a page description language (PDL) format that corresponds to the model of the printer selected by the user. The printer driver then transmits the PDL to the printer where it is rendered as a hardcopy.

BRIEF DESCRIPTION OF FIGURES

The detailed description is provided with reference to the accompanying figures. In the figures, the left-most digit(s) of a reference number identifies the figure in which the reference number first appears. The same numbers are used throughout the figures to reference like features and components.

DETAILED DESCRIPTION

Systems and methods for printing a document over a network are described herein.

Typically, multifunction devices facilitate a user to scan and print documents from a single device. The multifunction devices facilitate performing multiple jobs at one command. For example, the user may provide a command to scan a document and subsequently print the same document. However, there may be instances that the printed document may include less content and various portions of the document may be blank. This may lead to wastage of a printing medium, such as a sheet of paper on which the content is printed. At times, the user may have less content to be printed and the user may try to re-use the printed document. To re-use the printed document, the user may have to align the contents on the blank spaces of the printed document before giving a print command. This may be a cumbersome task for the user.

In many scenarios, a document may have to be reviewed by another user present in a different location. In such a scenario, a first user may upload the document on the cloud. For example, the first user may scan the document and save an image of the scanned document in a cloud storage system. The second user may access the cloud storage system to review the scanned document. To do so, the second user may have to take a print of the image on any printing media, such as a sheet of paper, or may need to convert the scanned image into editable content. The second user may make some modifications in the document while reviewing the same and may share the reviewed document with the first user via the cloud. To identify the modifications done by the second user, the first user may compare scanned versions of the updated document. However, the user may be unable to retrieve the additional content separately from the scanned document.

Further, if a user tries to print some content on a sheet of paper having a pre-defined template, such as a letterhead, the user may have to first identify margins of the letterhead and then align the content within the margins, before printing the content thereupon. Further, to ensure that the content fits within the margins of the letterhead, the user may have to print the content on a few letterheads with different alignments to select a final alignment. However, this may be a time consuming task. Also, as the user prints a few letterheads to check for the alignment of the content, ink and sheets of paper may get wasted.

Systems and methods described herein facilitate in printing a document over a network. The present subject matter relates to a multifunctional printing system capable of providing printing and scanning functionalities. The multifunctional printing system may include a cloud storage system and a multifunction device, such as a scanner-printer. The multifunctional printing system may facilitate a user to print content on an already printed media, such as a sheet of paper. The multifunction device may scan a document and upload the scanned document directly to the cloud. Further, the cloud storage system may be employed to store the scanned documents. The scanned documents may be stored in the form of images. Each image in the cloud storage system may be associated with a document Id. Further, the cloud storage system may facilitate in reducing noise in the images by utilizing various noise reduction techniques on the images, to obtain clear images of the scanned documents that may be used for further actions.

The cloud storage system may further extract metadata associated with the scanned documents. The extracted metadata may be stored in a metadata repository associated with the cloud storage system. The cloud storage system may also compare two documents based on the extracted metadata, to identify new content in the two documents. In an implementation, the two documents may be two versions of a scanned document. In an alternative implementation, the two documents may be different. Further, the identified new content may be utilized in different ways by different users. For example, a user may use the multifunction printing system to provide instructions to print the new content on a printing media, such as a sheet of paper.

In an implementation, the multifunction device may facilitate in printing the new content on a printed-upon media, such as an already printed sheet of paper. In said implementation, a layout of the already printed sheet of paper is scanned and stored in the cloud database, and the metadata associated with the already printed sheet of paper is stored in the metadata repository. The multifunction device may the retrieve the metadata associated with the already printed sheet of paper from the metadata repository. The metadata may include information about availability or non-availability of blank spaces on the already printed sheet of paper. Further, the multifunction device may provide the user with options to align the new content on the already printed sheet of paper. For example, based on the availability of the blank spaces, the multifunction device may provide options to the user to align the new content on the already printed sheet of paper. Accordingly, the multifunction device may facilitate in positioning the new content on the already printed sheet of paper.

Further, the multifunction device may also enable the user to specify orientation of the new content to be printed on the already printed sheet of paper. Considering an example where the already printed sheet of paper is a letterhead of a company. Using the multifunction device, the user may print content within the available blank spaces on the letterhead. As described above, the multifunction device may scan the letterhead and may identify various portions of the letterhead where the blank spaces are available. Further, the multifunction device may analyze the content defined by the user for being printed on the letterhead. The multifunction device may then compare the metadata associated with the letterhead with the content defined by the user and may align the content in a manner as to fit within the blank spaces of the letterhead.

Accordingly, the multifunctional printing system of the present subject matter may facilitate the user to capture modifications in different versions of a scanned document. The user may also print the modifications on an already printed sheet of paper. The multifunctional printing system, therefore, facilitates in utilizing the blank spaces on the already printed sheet of paper for printing small contents thereon.

The above systems and methods are further described in conjunction with the following figures. It should be noted that the description and figures merely illustrate the principles of the present subject matter. Further, various arrangements may be devised that, although not explicitly described or shown herein, embody the principles of the present subject matter and are included within its spirit and scope.

The manner in which the systems and the methods for printing content over a network are implemented shall be explained in details with respect to FIGS. 1a, 1b, 2, 3 and 4. While aspects of described system and method for printing a document over a network can be implemented in any number of different computing systems, environments, and/or configurations, the examples and implementations are described in the context of the following example system(s).

Figure 1A:
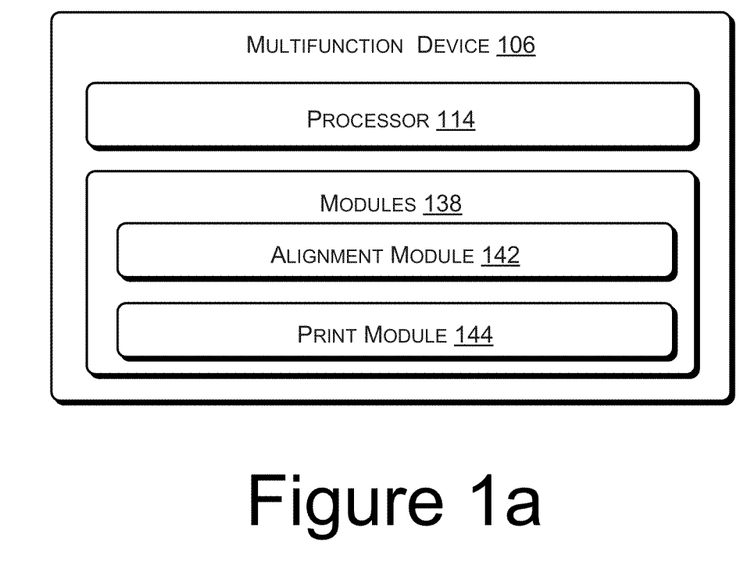
FIG. 1a schematically illustrates components of a multi-function printing system, according to an example of the present subject matter.

FIG. 1a schematically illustrates the components of a multifunction printing system 102, according to an example of the present subject matter. In one example, the multifunction printing system 102 may be implemented as any commercially available printer.

In one implementation, the multifunction printing system 102 includes a processor 114 and modules 138 communicatively coupled to the processor 114. The processor 114 may include microprocessors, microcomputers, microcontrollers, digital signal processors, central processing units, state machines, logic circuitries and/or any other devices that manipulate signals and data based on computer-readable instructions. Among other capabilities, the processor 114 may fetch and execute computer-readable instructions stored in the memory 116. Functions of the various elements shown in the figures, including any functional blocks labeled as "processor(s)", may be provided through the use of dedicated hardware as well as hardware capable of executing computer-readable instructions.

The modules 138, amongst other things, include routines, programs, objects, components, and data structures, which perform particular tasks or implement particular abstract data types. The modules 138 may also be implemented as, signal processor(s), state machine(s), logic circuitries, and/or any other device or component that manipulate signals based on operational instructions. Further, the modules 138 can be implemented by a hardware, by computer-readable instructions executed by a processing unit, or by a combination thereof. In one implementation, the modules 138 include an alignment module 142 and a print module 144.

In one example, the alignment module 142 facilitates in alignment of new content on an already printed sheet of paper. The alignment module 142 may allow various simple Internet printing (SIP) applications integrated in the multifunction device 106 to control the alignment of the new content on the already printed sheet of paper. For example, the alignment module 142 may position the new content on a top left corner of the already printed sheet of paper or change the orientation of the new content to accommodate the same on the already printed sheet of paper. The alignment module 142 may receive multiple alignment options for different contents as part of a single print job.

Based on the alignment of the new content, the print module 144 may print the new content on the already printed sheet of paper. The print module 144 may also print pre-defined content on templates that may be defined by a user. Templates may be understood to contain static content, such as a business' letter head, a logo, and a water mark.

Figure 1B:
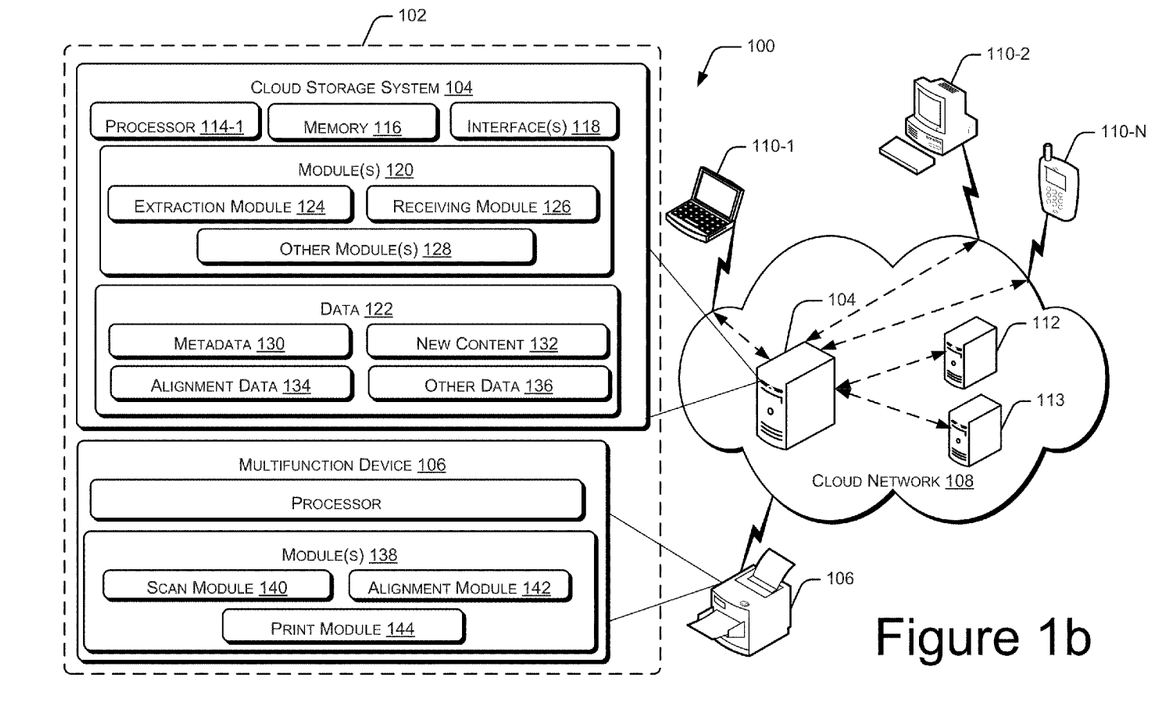
FIG. 1b schematically illustrates the multifunctional printing system in a network environment, in accordance with an example of the present subject matter.

FIG. 1b schematically illustrates a multifunctional printing system 102 in a network environment 100, in accordance with an example of the present subject matter. The multifunctional printing system 102 may be implemented as various commercially available multifunction devices, such as a printer-scanner, and a printer-scanner-copier-fax. In an implementation, the multifunctional printing system 102 may include a cloud storage system 104 and a multifunction device 106. The cloud storage system 104 may include, but is not limited to, a server, a workstation, a computer, and the like, and may be hosted remotely by a vendor for managing scanned documents. The multifunctional printing system 102 can be used to host an application for a user to print content over a network.

For the purpose of providing cloud printing solution in the network environment 100, the multifunctional printing system 102 is communicatively coupled over a cloud network 108 with a plurality of computing devices 110-1, 110-2, . . . , 110-N. The computing devices 110-1, 110-2, . . . , 110-N, can be collectively referred to as computing devices 110, and individually referred to as a computing device 110, hereinafter.

The computing devices 110 can include, but are not restricted to, desktop computers, laptops, smart phones, personal digital assistants (PDAs), tablets, and the like. The computing devices 110 are communicatively coupled to the multifunctional printing system 102 over the cloud network 108. Further, the multifunctional printing system 102 is communicatively coupled to a cloud database 112 and a metadata repository 113 for storing data.

In an implementation, the cloud storage system 104 includes processor 114, and a memory 116 connected to the processor 114. The memory 116, communicatively coupled to the processor 114, can include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The cloud storage system 104 also includes interface(s) 118. The interfaces 118 may include a variety of commercially available interfaces, for example, interfaces for peripheral device(s), such as data input output devices, referred to as I/O devices, storage devices, network device. The I/O device(s) may include Universal Serial Bus (USB) ports, Ethernet ports, host bus adaptors, and their corresponding device drivers. The interface(s) 118 facilitate the communication of the cloud storage system 104 with various communication and computing devices and various communication networks, such as networks that use a variety of protocols, for example, Hypertext Transfer Protocol (HTTP) and Transmission Control Protocol/Internet Protocol (TCP/IP).

Further, the cloud storage system 104 may include module(s) 120. The modules 120 may be coupled to the processors 114. The modules 120, amongst other things, include routines, programs, objects, components, data structures, which perform particular tasks or implement particular abstract data types. The modules 120 may also be implemented as, signal processor(s), state machine(s), logic circuitries, and/or any other device or component that manipulate signals based on computer-readable instructions.

In said implementation, the module(s) 120 include an extraction module 124, a receiving module 126, and other module(s) 128. The other module(s) 128 may include computer-readable instructions that supplement applications or functions performed by the cloud storage system 104.

Further, the cloud storage system 104 may also include data 122. In one implementation, the data 122 includes metadata 130, new content 132, alignment data 134, and other data 136. The other data 136 may include data generated and saved by the modules 120 for providing various functionalities of the cloud storage system 104.

Further, the multifunction device 106 may include a scan module 138, an alignment module 140, and a print module 142. The multifunction device 106 facilitates in scanning a document, uploading the scanned document to the cloud network 108, determining optimal alignment settings for content, and printing the content on a printing media, such as a sheet of paper.

In an implementation, the multifunction device 106 may include a plurality of applications that may have information compiled from across the Internet to provide the users with specific data. The multifunction device 106 may also facilitate the user to provide scan and print instructions together. For example, a user may provide instructions to scan a document and print the same at another device, such as a printer located at a different location.

Accordingly, the scan module 138 of the multifunction device 106 may scan a plurality of document. The scanned documents may then be directly uploaded to the cloud by the scan module 138. The scanned documents may be stored as images on the cloud. Each of these images may be referred at a later point in time and therefore may be associated with a document ID. The document ID may include, for example, a user ID or an ID of the multifunction device 106. The document ID may facilitate a user to identify a correct image of the scanned document in future. In an implementation, the scan module 138 may facilitate the user to directly upload the scanned documents to a third party storage service, send the scanned documents to e-mail, and the like. For example, the scanned documents may be stored in the cloud database 112.

In an implementation, the cloud database 112 may store the scanned documents temporarily. This may facilitate different applications to utilize the scanned documents to decide subsequent print contents. For example, a user may provide combined instructions to scan and print a document at another device, such as a printer located at a different location. If the printer is not accessible due to any reason, say the printer is switched off, the cloud database 112 may store the scanned document as an image. Later when the printer is switched on, the scanned document may get printed. In another example, in case there is any type of communication failure between the multifunction device 106 and the printer, the scanned documents may be stored in the cloud database 112 for a certain period of time. As mentioned earlier, the scanned documents are associated with a document ID that may be used by the different applications to retrieve the image of the scanned document from the cloud database 112.

Further, the images of the scanned documents may be distorted with respect to original documents. The distortion can be caused by electronic noise and inaccurate measurement of white level. For example, when scanning a sheet of paper, the sheet of paper is generally not captured as exactly white as a result of inaccurate calibration of the scanner with respect to each paper type. These scanning distortions can blur edges, and create noise and artifacts in digital images, thereby degrading image quality. The cloud storage system 104 may facilitate in reducing noise from the images of the scanned documents. The extraction module 124 may utilize commercially available image processing techniques to reduce the noise from the images. The extraction module 124 may remove noise from various parts of the images, such as margins, borders, and background, to provide comparatively clear images of the scanned documents.

The cloud storage system 104 of the present subject matter may facilitate in managing the scanned documents in the cloud. For example, the extraction module 124 may extract metadata associated with each of the images of the scanned documents. The metadata may include, but is not limited to, size of the scanned document, name of a user scanning the document, an ID or name associated with the device that may be used for scanning the document, format of the scanned document (document format, portable document format), margins on the scanned document, borders of the scanned document, pixel layout of the scanned document, and availability of blank spaces on the scanned document. In an implementation, the cloud storage system 104 may facilitate users to perform search on the stored images of the scanned documents, based on the metadata.

The extraction module 124 may determine the pixel layout of the scanned document to identify where or which portions of the scanned document may include printed content. Further, the extraction module 124 may classify the blank spaces that may be identified as metadata, into different categories based on size of the blank spaces available at various portions of the scanned document. For example, for a scanned document, the extraction module 124 may identify if the blank spaces are available on a top left or a bottom right corner. The extraction module 124 may then classify the available blank spaces into different groups based on the size (length and width) and location of the blank spaces on the scanned document. The classification of the blank spaces may help in printing small contents, such as an image, or a ticket on an already printed document. Further, the extraction module 124 may store the extracted metadata in the metadata repository 113.

In an implementation, the receiving module 126 of the cloud storage system 104 compares versions of a scanned document to identify any incremental update in the image of the scanned document. The receiving module 126 may compare the metadata associated with both the versions of the scanned document to identify any addition or deletion of content in the versions of the scanned document. Considering a scenario, where a document, such as a legal document has to be shared between two users at different locations. In this scenario, a first user may provide instructions to a multifunction device, such as the multifunction device 106, to scan and print the legal document at a second user's end. Upon receiving a printout of the scanned document, the second user may sign the legal document and may re-send the signed document to the first user by scanning the signed document.

When the legal document is being shared between the two users, the cloud database 112 may store the image of the scanned document (unsigned and signed). Based on the stored images, the extraction module 124 of the cloud storage system 104 may extract metadata associated with both versions of the legal document. Thereafter, the receiving module 126 may compare the blank spaces of the two versions of the legal document and may identify the newly added content, i.e., signatures in the legal document. Accordingly, the receiving module 126 indicates the new content based on the comparison. For example, the receiving module 126 may highlight the new content in the updated document. The receiving module 126 stores the newly added content as new content 132.

Further, when the first user takes the print of the signed document, the alignment module 140 of the multifunction device 106 may provide different printing options to the first user. For example, based on the determination of the new content 132, the alignment module 140 may prompt the user to print only the new content 132. In an implementation, a user may wish to use an already printed sheet of paper for printing the new content 132. In this regard, the alignment module 140 may identify the blank spaces on the already printed sheet of paper and compare the same with the new content 132. If the blank space is sufficient for printing the new content 132, the alignment module 140 may determine the orientation of the new content 132 with respect to the availability of blank spaces. Alternatively, the alignment module 140 may be used by the user to select a specific location and orientation of the new content 132 on the already printed paper. Thereafter, the alignment module 140 may print the new content 132 on the already printed sheet of paper.

In an implementation, the multifunctional printing system 102 may facilitate in identifying a number of document workflow scenarios in which a document may go through a plurality of steps before being delivered to an end-user. The document workflow scenarios may utilize the capabilities of the multifunctional printing system 102 such as comparison of different versions of a scanned document based on the metadata associated therewith. The multifunctional printing system 102 may facilitate in capturing any change in content of a document. For example, addition, or deletion of content made to the scanned document may be captured by the multifunctional printing system 102 using the cloud storage system 104. The captured content is correspondingly reproduced on an original sheet of paper. To do so, the multifunctional printing system 102 may generate a print job for the new content. The scan module 138 may facilitate the user to scan an already printed sheet of paper using the multifunction device 106. Further, the alignment module 140 may automatically change the alignment of the new content based on the existing contents on the paper. The alignment module 140 may identify blank spaces in the already printed sheet of paper to ensure that the new content is aligned with the blank spaces. Thereafter, the print module 142 may print the new content 132 on the already printed sheet of paper in such a manner that the new content 132 is not overlapping with the margins and other existing contents.

In another example, the users may define a template on which the new content needs to be printed. Templates may be understood to contain static content, such as a business' letter head, a logo, and a water mark. Templates are usually printed separately and are fed into a printing device, such as the multifunction device 106. The users may provide instructions to print small content on a pre-scanned template. Accordingly, the multifunctional printing system 102 of the present subject matter may facilitate the users to first scan a template and using the extraction module 124, find the blank spaces on the template.

Based on the identified blank spaces, the alignment module 140 aligns any new content 132 with correct alignment options. The user may then feed template sheets to the multifunction device 106 and the contents can be continuously printed by the print module 142. This feature of the multifunctional printing system 102 can be useful for businesses to print receipts, business letters, price quotes, and the like, where a template can be prepared and can later be filled in with variable data.

Furthermore, the multifunctional printing system 102 allows the users to get their documents signed by another person who may be situated remotely. In yet another example, User A may scan a sheet of paper by utilizing the scan module 138 of the multifunction device 106 and address the scanned document to User B. User B may get a notification or print on their multifunction device 106. On getting the physical copy of the scanned document, User B may sign the document and again place the sheet of paper on the multifunction device 106 as a reply to User A's request.

As described above, the new scanned document from User B may be stored in the cloud database as an updated version of the document from User A. The multifunctional printing system 102 may provide User A with options to either print new content 132 on an original paper or to get a new print of the updated document. In case User A selects to print only the new content 132, the print module 142 may communicate with the receiving module 126 to identify the difference between the two versions of the scanned documents to find the new content 132. The new content 132 may then be transmitted to the alignment module 140 over the cloud network 108. The alignment module 140 may determine a suitable alignment for rendering the new content 132. Further, User A may feed the original sheet of paper to the multifunction device 106 so that the print module 142 may initiate printing the new content 132 only.

Figure 2:
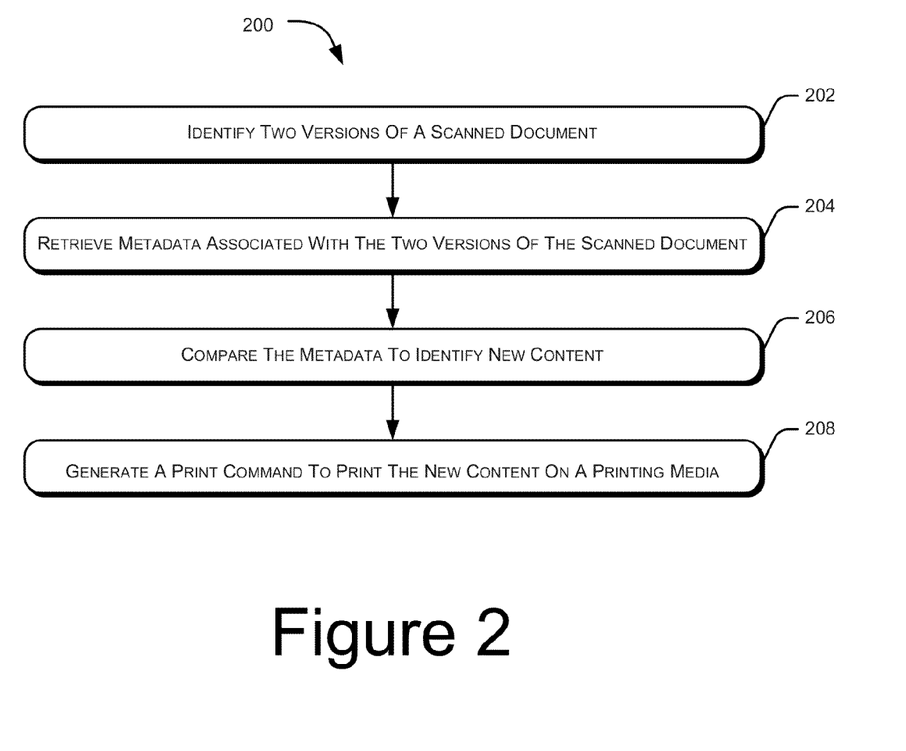
FIG. 2 schematically illustrates a method for printing a document, in accordance with an example of the present subject matter.
Figure 3:
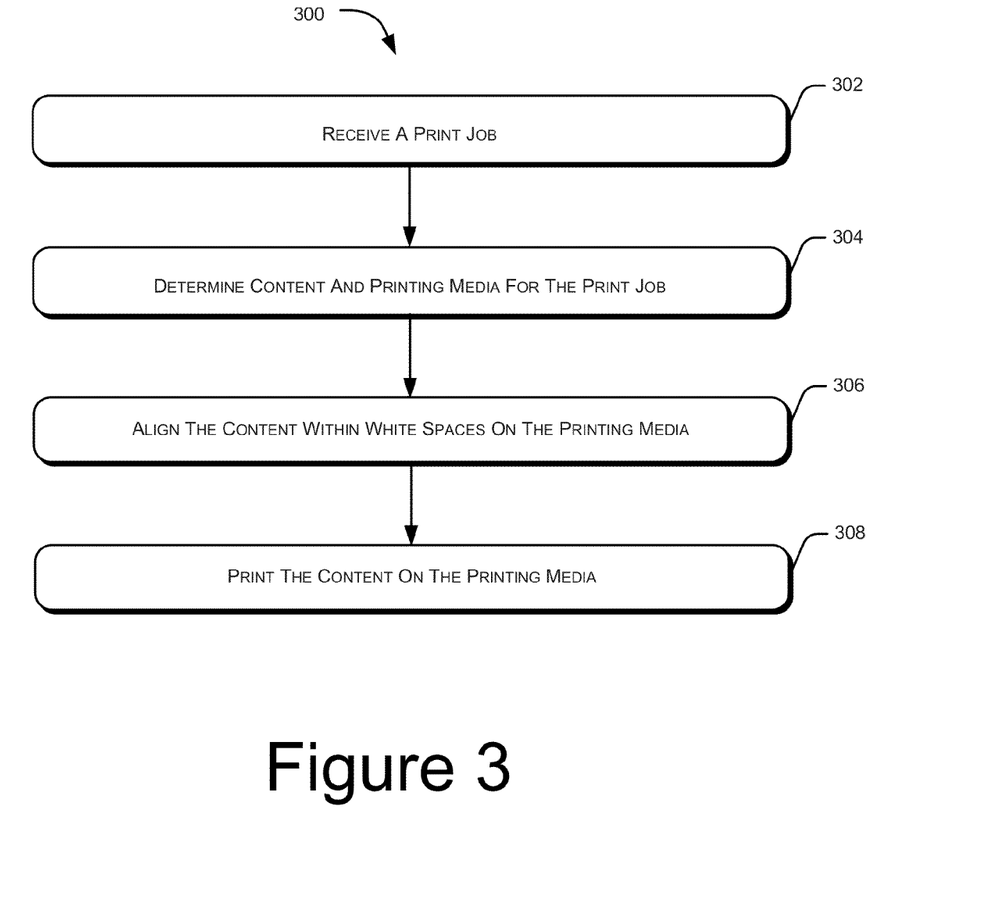
FIG. 3 schematically illustrates a method for printing content on a printed-upon printing media over a network, in accordance with an example of the present subject matter.

FIG. 2 schematically illustrates a method for printing content on a printing media, in accordance with an example of the present subject matter and FIG. 3 schematically illustrates example method for printing content on a printed-upon printing media the new content over a cloud network, in accordance with an example of the present subject matter. The order in which the methods 200 and 300 are described is not intended to be construed as a limitation, and any number of the described method blocks can be combined in any order to implement methods 200 and 300 or an alternative method. Additionally, individual blocks may be deleted from the methods 200 and 300 without departing from the spirit and scope of the subject matter described herein. Furthermore, the methods 200 and 300 may be implemented in any suitable hardware, machine readable instructions, firmware, or combination thereof.

A person skilled in the art will readily recognize that steps of the methods 200 and 300 can be performed by programmed computers. Herein, some examples are also intended to cover program storage devices, for example, digital data storage media, which are machine or computer readable and encode machine-executable or computer-executable programs of instructions, where said instructions perform some or all of the steps of the described methods 200 and 300. The program storage devices may be, for example, digital memories, magnetic storage media, such as a magnetic disks and magnetic tapes, hard drives, or optically readable digital data storage media.

With reference to method 200 as depicted in FIG. 2, as depicted in block 202 two versions of a scanned document are identified. In an implementation, the two versions are identified on the basis of the document ID associated with the scanned document.

As illustrated in block 204, metadata associated with the two versions is retrieved. In an implementation, the extraction module 124 may extract metadata associated with the two versions and store the metadata 130 in the metadata repository 113. The receiving module 126 retrieves the metadata 130 from the metadata repository 113.

As shown in block 206, the metadata 130 associated with the two versions is compared, for example, by the receiving module 126. The metadata 130 may include, but is not limited to, size of the scanned document, name of a user scanning the document, an ID or name associated with the device that may be used for scanning the document, type of the scanned document (.doc, .pdf), margins on the scanned document, borders of the scanned document, pixel layout of the scanned document, and availability of whitespaces on the scanned document. The comparison facilitates in identify new content in the scanned document.

At block 208, a print command is generated to print the new content on a printing media. The printing media may be understood as a sheet of paper. The sheet of paper may be new or already printed, based on the user requirement. In an implementation, the receiving module 126 generates a print job that may include transmitting instructions to print the new content on the printing media. The cloud storage system 104 may transmit the print job to the multifunction device 106 associated therewith over the cloud network 108.

With reference to method 300 as depicted in FIG. 3, as depicted in block 302, a print job is received by a multifunction device, such as the multifunction device 106. The print job may include instructions to print content on a printing media. In an implementation, the print job may be received from a user or a cloud storage system.

As shown in block 304, content and a printing media associated with the print job is determined. A layout of the printing media may be scanned and stored in the cloud database 112. Further, metadata associated with the content and the printing media may be stored in the metadata repository 113. In an implementation, the alignment module 140 retrieves the image of the printing media from the cloud database 112 and the metadata 130 may be retrieved from the metadata repository 113. Further, the content may be identified by comparing versions of a scanned document. Alternatively, the content may be defined by a user.

As depicted in block 306, the content to be printed is aligned within the blank spaces of the printing media. The alignment module 140 may align the content on the printing media. The alignment module 140 may orient the content within the blank spaces based on the availability of the blank spaces on the printing media.

At block 308, the content is printed on the printing media. The print module 142 of the multifunction device 106 may print the content based on the alignment and orientation settings as specified by the alignment module 140.

Figure 4:
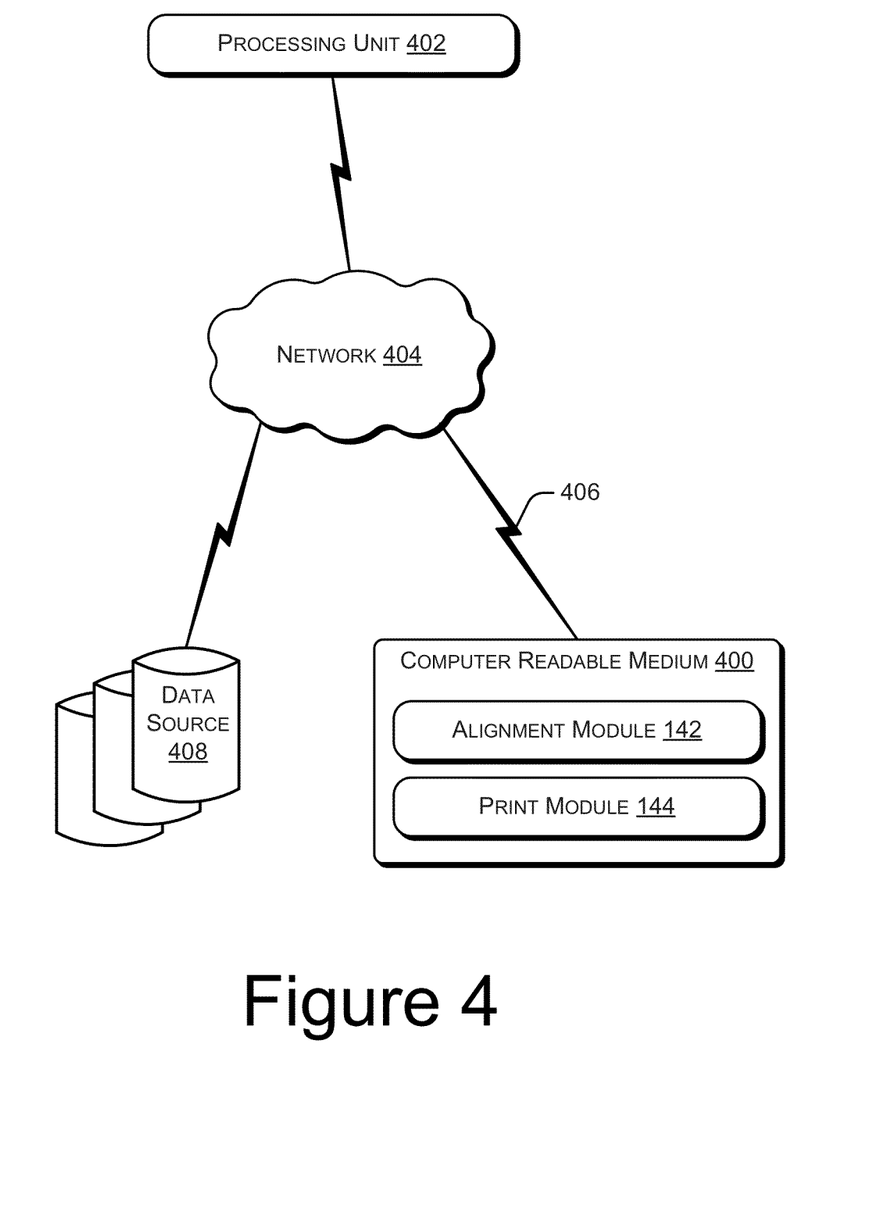
FIG. 4 illustrates a computer readable medium storing instructions for printing a document, according to an example of the present subject matter.

FIG. 4 illustrates a computer readable medium 400 storing instructions for printing a document, according to an example of the present subject matter. In one example, the computer readable medium 400 is communicatively coupled to a processing unit 402 over a network 404 through a communication link 406.

For example, the processing unit 402 can be a computing device, such as a server, a laptop, a desktop, a mobile device, and the like. The computer readable medium 400 can be, for example, an internal memory device or an external memory device or any commercially available non transitory computer readable medium. In one implementation, the communication link 406 may be a direct communication link, such as any memory read/write interface. In another implementation, the communication link 406 may be an indirect communication link, such as a network interface.

The processing unit 402 and the computer readable medium 400 may also be communicatively coupled to data sources 408 over the network 404. The data sources 408 can include, for example, databases and computing devices. The data sources 408 may be used by the requesters and the agents to communicate with the processing unit 402.

In one implementation, the computer readable medium 400 includes a set of computer readable instructions, such as an alignment module 142 and a print module 144. The set of computer readable instructions can be accessed by the processing unit 402 through the communication link 406 and subsequently executed to perform acts for printing a document.

On execution by the processing unit 402, the alignment module 142 may receive metadata associated with content and a printing media. The content may be defined by a user or may be obtained by comparing metadata associated with two scanned documents to identify new content on the basis of the comparison. Further, the printing media may include a sheet of paper that may be a blank sheet of paper or may be an already printed sheet of paper. In an example, the metadata may include but is not limited to, size of the scanned document, name of a user scanning the document, an ID or name associated with the device that may be used for scanning the document, format of the scanned document (document format, portable document format), margins on the scanned document, borders of the scanned document, pixel layout of the scanned document, and availability of blank spaces on the scanned document.

Upon receiving the metadata associated with the content and the printing media, the alignment module 142 may compare the metadata to align the content on the printing media. Thereafter, the print module 144 may print the content on the printing media as per the alignment specified by the alignment module 142.

Although implementations for the multifunctional printing system over the cloud network have been described in language specific to structural features and/or methods, it is to be understood that the appended claims are not necessarily limited to the specific features or methods described. Rather, the specific features and methods are disclosed as example implementations for determining and printing newly added content.

I claim:

1. A method of printing content over a network, the method comprising:

receiving, based on user instructions, new content to be printed on a printing medium comprising a layout of previously printed content, wherein the layout of the previously printed content is stored in a database;

retrieving metadata associated with the new content and metadata associated with the layout of the previously printed content, wherein the metadata is retrieved from a metadata repository;

determining, by a processor, an alignment of the new content to be printed with respect to the layout of previously printed content on the printing medium based on comparison of the metadata associated with the new content and the metadata associated with the layout of the previously printed content on the printing medium; and generating, by the processor, a print command for printing the new content on the printing medium, based on the determined alignment.

2. The method as claimed in claim 1, wherein the receiving comprises obtaining the new content, wherein the new content is identified by comparing two versions of same document.

3. The method as claimed in claim 1, wherein the metadata comprises an originating device ID, a document size, a document type, a pixel layout, blank spaces on a scanned document, and margins.

4. The method as claimed in claim 1, wherein the generating the print command comprises, aligning the new content within blank spaces of a pre-printed template; and generating a print job for printing the new content on the pre-printed template.

5. The method as claimed in claim 1, wherein the determining comprises:
   identifying the layout of the previously printed content on printing medium, based on the metadata associated with the layout of the previously printed content;
   determining blank spaces on the printing medium, based on the metadata associated with the layout of the previously printed content; and
   aligning the new content within the determined blank spaces on the printing medium.

6. A multifunctional printing system comprising a multifunction device, wherein the multifunction device comprises:
   a processor;
   an alignment module, coupled to the processor, to perform operations comprising:
      receiving metadata associated with new content to be printed and metadata associated with a layout of previously printed content on a printing medium; and
      determining an alignment of the new content with respect to the layout of previously printed content on the printing medium based on comparison of the metadata associated with the new content with the metadata associated with the layout of the previously printed content; and
   a print module, coupled to the processor, to print the new content on the printing medium based on the determined alignment.

7. The multifunctional printing system as claimed in claim 6, wherein the printing medium is a pre-printed template.

8. The multifunction printing system as claimed in claim 6, wherein the multifunction device further comprises a scan module, coupled to the processor, to scan a document and store the scanned document as an image in a cloud database.

9. The multifunction printing system as claimed in claim 8 further comprises a cloud storage system to generate a print job over a cloud, the cloud storage system comprising
   a receiving module to perform operations comprising:
      receiving, based on user instructions, the content to be printed on the printing medium, wherein a layout of the printing medium is stored in the cloud database; and
      retrieving the metadata associated with the content and the printing medium, wherein the metadata is retrieved from a metadata repository.

10. The multifunction printing system as claimed in claim 9, wherein the cloud storage system further comprises an extraction module to perform operations comprising:
   extracting metadata associated with an image of a scanned document, wherein the extracted metadata is stored in the metadata repository; and
   filtering out noise from the image of the scanned document.

11. A non-transitory computer-readable medium having a set of computer readable instructions that, when executed by a processor of a multifunction printing system, cause the processor to:
   receive, based on user instructions, new content to be printed on a printing medium comprising a layout of previously printed content, wherein the layout of the previously printed content is stored in a database;
   retrieve metadata associated with the new content and metadata associated with the layout of the previously printed content, wherein the metadata is retrieved from a metadata repository;
   determine an alignment of the new content to be printed with respect to the layout of previously printed content on the printing medium based on comparison of the metadata associated with the new content and the metadata associated with the layout of the previously printed content on the printing medium; and
   generate a print command to print the new content on the printing medium based on the determined alignment.

\* \* \* \* \*